United States Patent
Wang et al.

(10) Patent No.: US 11,126,639 B2
(45) Date of Patent: Sep. 21, 2021

(54) METHOD AND APPARATUS FOR SYNCHRONIZING DATA IN A ROBOT OPERATING SYSTEM

(71) Applicant: Beijing Baidu Netcom Science and Technology Co., Ltd., Beijing (CN)

(72) Inventors: Haifeng Wang, Beijing (CN); Wei He, Beijing (CN); Yu Ma, Beijing (CN); Weide Zhang, Beijing (CN); Liming Xia, Beijing (CN); Zhuo Chen, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 826 days.

(21) Appl. No.: 15/409,967

(22) Filed: Jan. 19, 2017

(65) Prior Publication Data

US 2018/0075119 A1    Mar. 15, 2018

(30) Foreign Application Priority Data

Sep. 12, 2016    (CN) .......................... 201610816642.8

(51) Int. Cl.
| | | |
|---|---|---|
| G06F 17/00 | (2019.01) | |
| G06F 7/00 | (2006.01) | |
| G06F 16/27 | (2019.01) | |
| B60R 16/023 | (2006.01) | |

(52) U.S. Cl.
CPC .......... *G06F 16/27* (2019.01); *B60R 16/0231* (2013.01)

(58) Field of Classification Search
CPC ............................ G06F 16/27; B60R 16/0231

USPC ........................................................ 707/621
See application file for complete search history.

(56) References Cited

U.S. PATENT DOCUMENTS

| | | | | |
|---|---|---|---|---|
| 6,016,501 | A * | 1/2000 | Martin | G06F 16/275 |
| 7,925,625 | B2 * | 4/2011 | Mathew | G06Q 10/06375 |
| | | | | 707/610 |
| 9,210,534 | B1 * | 12/2015 | Matthieu | H04L 67/18 |
| 10,117,055 | B2 * | 10/2018 | Frusina | H04L 47/38 |
| 10,393,532 | B2 * | 8/2019 | Foreman | G01C 21/3415 |
| 2002/0089927 | A1 * | 7/2002 | Fischer | H04W 28/02 |
| | | | | 370/229 |
| 2003/0037181 | A1 * | 2/2003 | Freed | G06Q 10/06 |
| | | | | 719/328 |

(Continued)

FOREIGN PATENT DOCUMENTS

| | | |
|---|---|---|
| CN | 102508722 A | 6/2012 |
| CN | 102523225 A | 6/2012 |

*Primary Examiner* — Pavan Mamillapalli
(74) *Attorney, Agent, or Firm* — Seed IP Law Group LLP

(57) ABSTRACT

This present application discloses a method and apparatus for synchronizing data in a robot operating system. A specific implementation of the method includes: detecting an operation on data being transmitted between communication processes, wherein the operation includes at least one of updating the data, deleting the data, and storing the data; determining whether the data are persistent data, in response to positively detecting an operation on the data being transmitted between the communication processes; and transmitting a change message of the data to communication processes other than the communication processes in response to positively determining that the data are persistent data. In the embodiment, the persistent data may always remain consistent across the communication processes.

12 Claims, 5 Drawing Sheets

(56) References Cited

U.S. PATENT DOCUMENTS

| | | | | |
|---|---|---|---|---|
| 2006/0026198 A1* | 2/2006 | Emery | ................ | H04M 1/2757 |
| | | | | 707/999.103 |
| 2011/0173294 A1* | 7/2011 | Jackson | .................. | G06F 16/27 |
| | | | | 709/217 |
| 2015/0135002 A1* | 5/2015 | Harpaz | ............... | G06F 11/2097 |
| | | | | 714/6.3 |
| 2015/0271208 A1* | 9/2015 | Gallant | ................ | H04L 9/3247 |
| | | | | 726/1 |
| 2016/0379493 A1* | 12/2016 | Bhuiya | .................. | H04W 4/40 |
| | | | | 701/117 |
| 2018/0302461 A1* | 10/2018 | Xu | ............................ | H04L 1/08 |

* cited by examiner

METHOD AND APPARATUS FOR SYNCHRONIZING DATA IN A ROBOT OPERATING SYSTEM

CROSS REFERENCE TO RELATED APPLICATIONS

This application claims the priority of Chinese Patent Application No. 201610816642.8, entitled "Method and Apparatus for Synchronizing Data in a Robot Operating System," filed on Sep. 12, 2016, the content of which is incorporated herein by reference in its entirety.

TECHNICAL FIELD

The present application generally relates to the field of computer technology, particularly to the field of data processing technology, and more particularly to a method and apparatus for synchronizing data in a robot operating system.

BACKGROUND

Artificial intelligence, vision computing, video camera, radar sensor, laser radar, and global positioning system of a driverless vehicle interoperate so that the driverless vehicle can be operated automatically and securely by a Robot Operating System (ROS) without any active human operation. The sensor of the driverless vehicle needs to be calibrated both before the vehicle is shipped from a factory, and while the vehicle is travelling. These calibration data, and the vehicle state of the driverless vehicle need to be persistent.

However the robot operating system has not been provided with a corresponding data persisting mechanism. The data can be written into a hard disk in the form of a file in the prior art, this solution is so inflexible that the robot operating system may not automatically notify respective programming nodes in the system when the persistent data are updated, thus resulting in the data inconsistency, and abnormal system conditions.

SUMMARY

An object of the present application is to provide an improved method and apparatus for synchronizing data in a robot operating system so as to address the technical problem mentioned in the BACKGROUND section.

In a first aspect, an embodiment of the present application provide a method for synchronizing data in a robot operating system, the method including: detecting an operation on data being transmitted between communication processes, wherein the operation includes at least one of updating the data, deleting the data, and storing the data; determining whether the data are persistent data, in response to positively detecting an operation on the data being transmitted between the communication processes; and transmitting a change message of the data to communication processes other than the communication processes in response to positively determining that the data are persistent data.

In some embodiments, the determining whether the data are persistent data includes: determining whether a value representing data persisting of the data is True; and if so, then determining that the data are persistent data.

In some embodiments, the method further comprises, prior to the detecting an operation on the data being transmitted between the communication processes, setting the value representing data persisting of the persistent data to True, and a value representing data persisting of non-persistent data to False.

In some embodiments, the method further comprises, prior to the detecting an operation on the data being transmitted between the communication processes: receiving registration information of the communication process, wherein the registration information includes at least one of an Internet Protocol (IP) address, a port number, and a communication topic.

In some embodiments, the method further comprises, after the receiving the registration information of the communication process: receiving a communication request of the communication process; and transmitting to the communication process registration information of a remaining communication process other than the communication process, the remaining communication process having an identical communication topic with the communication process.

In a second aspect, an embodiment of the present application provide an apparatus for synchronizing data in a robot operating system, the apparatus including: a detecting unit configured to detect an operation on data being transmitted between communication processes, wherein the operation includes at least one of updating the data, deleting the data, and storing the data; a determining unit configured to determine whether the data are persistent data, in response to positively detecting an operation on the data being transmitted between the communication processes; and a first transmitting unit configured to transmit a change message of the data to communication processes other than the communication processes in response to positively determining that the data are persistent data.

In some embodiments, the determining unit is further configured to: determine whether a value representing data persisting of the data is True; and if so, determine that the data are persistent data.

In some embodiments, the apparatus further includes: a setting unit configured to set the value representing data persisting of the persistent data to True, and a value representing data persisting of non-persistent data to False.

In some embodiments, the apparatus further includes: a first receiving unit configured to receive registration information of the communication process, wherein the registration information includes at least one of an Internet Protocol (IP) address, a port number, and a communication topic.

In some embodiments, the apparatus further includes: a second receiving unit configured to receive a communication request of the communication process; and a second transmitting unit configured to transmit to the communication process registration information of a remaining communication process other than the communication process, the remaining communication process having an identical communication topic with the communication process.

With the method and apparatus for synchronizing data in a robot operating system according to the embodiments of the present application, firstly the communication process of the robot operating system is detected for an operation on the data; and if such an operation is detected, then it will be further determined whether the operated data are persistent data, and if so, then the change message of the data will be transmitted to the remaining communication process, so that the persistent data may always remain consistent across the communication processes.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
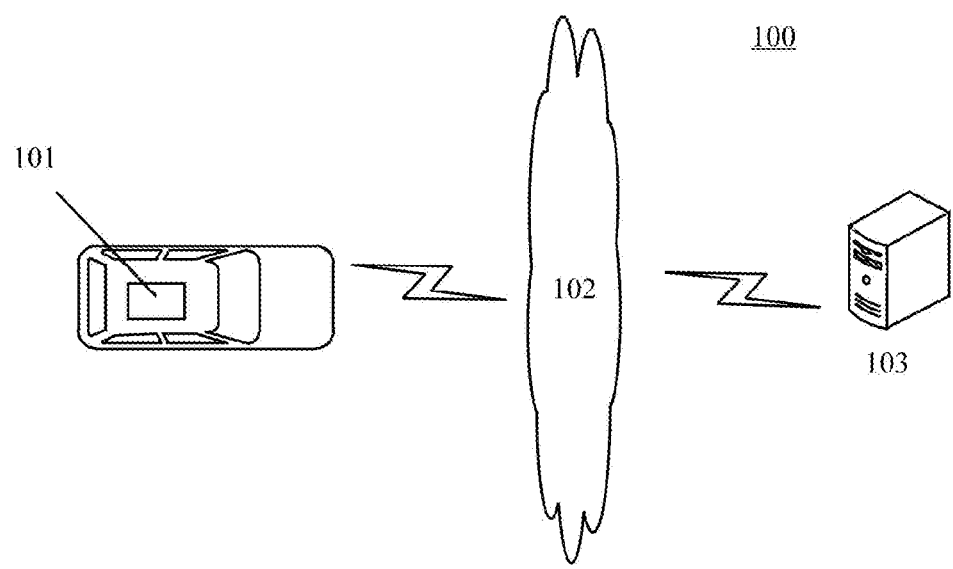
FIG. 1 is an architectural diagram of an exemplary system to which the present application may be implemented.

FIG. 1 illustrates an exemplary system architecture 100 in which a method or apparatus for synchronizing data in a robot operating system according to an embodiment of the present application may be implemented.

As illustrated in FIG. 1, the system architecture 100 may include an on-vehicle terminal device 101, a cloud server 103, and a network 102. The network 102 serves as a medium providing a communication link between the on-vehicle terminal device 101 and the cloud server 103. The network 102 may include various types of connections, e.g., wired or wireless communication links, or optic fiber cables.

The cloud server 103 may be a server providing various services, e.g., a server in which nominated calibration data on the on-vehicle terminal device 101, and a vehicle state may be stored.

A data detecting system and a message transmitting system of a driverless vehicle may be installed on the on-vehicle terminal device 101. If the data detecting system detects that changed data are persistent data, then the message transmitting system will transmit a change message of the data to communication processes other than the communication process which performs operations on the data. Through the cooperation of the modules in the vehicle, the on-vehicle terminal device 101 uses an improved robot operating system to transmit the change message of the persistent data to other communication processes for updating of the persistent data, and also to the cloud server 103 for storing of the persistent data.

It should be noted that the method for synchronizing data in a robot operating system according to the embodiment of the present application is generally performed by the on-vehicle terminal device 101, and accordingly an apparatus for synchronizing data in a robot operating system is generally provided in the on-vehicle terminal device 101.

It should be appreciated that the numbers of the on-vehicle terminal devices, the networks, and the cloud servers in FIG. 1 are merely illustrative. There may be any number of on-vehicle terminal devices, networks, and cloud servers based on actual requirements. The on-vehicle terminal device may also operate separately without any cloud server or network.

Figure 2:
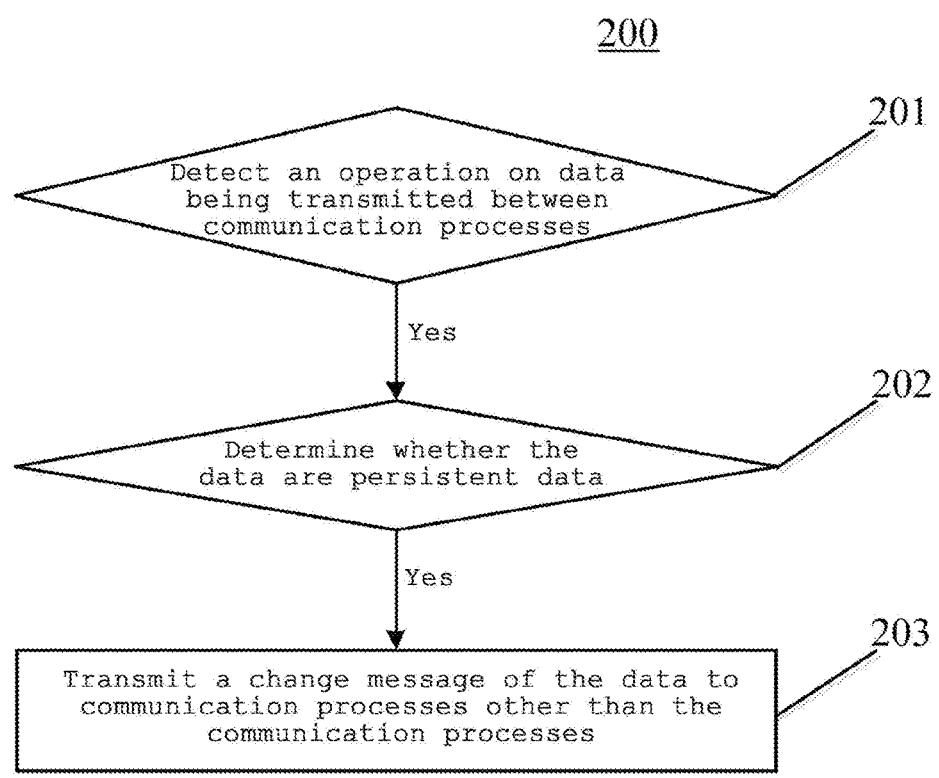
FIG. 2 is a flow chart of a method for synchronizing data in a robot operating system according to an embodiment of the present application.

Further reference will be made to FIG. 2 illustrating a flow 200 of a method for synchronizing data in a robot operating system according to an embodiment of the present application. The method for synchronizing data in the robot operating system includes the following steps:

Step 201, detect an operation on data being transmitted between communication processes.

In this embodiment, there may be a management process and a plurality of communication processes in an operating system on which the method for synchronizing data in the robot operating system is performed (e.g., the robot operating system in the on-vehicle controller as illustrated in FIG. 1). There may be a parameter server in the management process. The above-mentioned parameter server is configured to store and maintain parameters of the robot operating system in operation, e.g., intermediate state variables, and calibration information. The operating system may detect an operation on the data being transmitted between the communication processes, wherein the operation may include at least one of updating the data, deleting the data, and storing the data.

In this embodiment, the communication processes in the operating system may operate on the data via the unified XML Remote Procedure Call (XML) Application Programming Interface (API) which adopts the Hyper Text Transfer Protocol (HTTP) as a transmission protocol, and the eXtensible Markup Language (XML) as a remote procedure call programming interface via which an encoding format of information is transmitted. The RPC is a technology to call on a local machine a procedure (method) on a remote machine, and an RPC system includes two components, i.e., an RPC client (a remote procedure call client) and an RPC server (a remote procedure call server), wherein the RPC client is configured to invoke a method from the RPC server, and to receive returned data of the method, and the RPC server is configured to respond to the request of the RPC client, to execute the method, and to return a result of executing the method. The above-mentioned XML, which is a subset of the standard universal markup language, is a markup language to structurally mark an electronic file. The above-mentioned API includes some predefined functions aiming to provide an application and a developer with the ability of accessing a set of routines based upon some software or hardware without accessing any source codes or knowing any details of the internal operating mechanism.

In this embodiment, the data on which the communication processes of the operating system performs operations may adopt the unified Key-Value data structure, may support various general data types and user customized data types, and may support deep nesting of data structures.

In some optional implementations of this embodiment, when storing data, the operating system may set a value (Persist) representing data persisting of the persistent data to True (T), and a value representing data persisting of non-persistent data to False (F).

Step 202, determine whether the data are persistent data, in response to positively detecting an operation on the data being transmitted between the communication processes.

In this embodiment, the operating system may determine whether the data are persistent data, in response to positively detecting an operation on the data being transmitted between the communication processes, wherein the persistent data refer to an object stored in a persistent storage device, e.g., data stored in a magnetic disk, a flash memory, and an XML data file.

In some optional implementations of this embodiment, the persistent data may be distinguished from the non-persistent data by an interface flag, and the robot operating system may store the respective parameters by setting a persistent or non-persistent attribute for the respective data according to the interface flag. The operating system may determine whether the value representing data persisting of the data is True, and if so (that is, Persist=True), then the operating system will determine that the persistent data are persistent data; otherwise (that is, Persist=False), the operating system will determine that the data are non-persistent data.

Step 203, transmit change message of the data to a communication process other than the communication process in response to positively determining that the data are persistent data.

In this embodiment, the operating system may transmit the change message of the data to a communication process other than the above-mentioned communication process in response to positively determining that the data are persistent data, so that the communication process other than the above-mentioned communication process is updated based on the change message, so the persistent data can always remain consistent across the respective communication processes.

Figure 3:
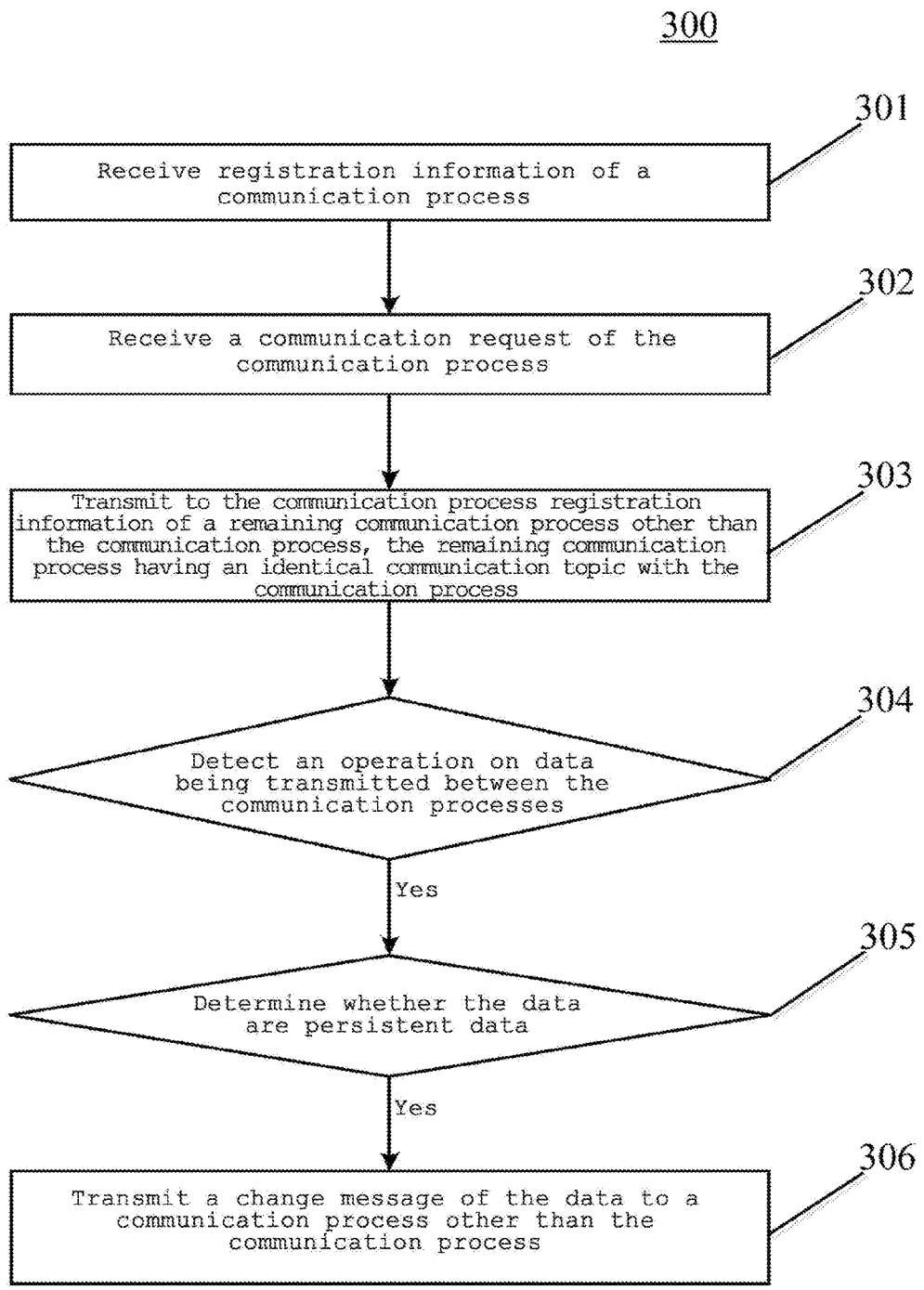
FIG. 3 is a flow chart of a method for synchronizing data in a robot operating system according to another embodiment of the present application.

Further reference will be made to FIG. 3 illustrating a flow 300 of a method for synchronizing data in a robot operating system according to another embodiment of the present application. The flow 300 of the method for synchronizing data in the robot operating system includes the followings steps:

Step 301, receive registration information of a communication process.

In this embodiment, an operating system on which the method for synchronizing data in the robot operating system is performed (e.g., the robot operating system in the on-vehicle controller as illustrated in FIG. 1) may first start a parameter server of the operating system; thereafter may start the communication process; and then receive the registration information of the communication process, where the registration information may include at least one of an Internet Protocol (IP) address, a port number, and a communication topic, and the communication topic may include the name of the communication topic, the size of the communication topic, etc. The operating system may also set parameter values while starting the communication process.

Step 302, receive a communication request of the communication process.

In this embodiment, the operating system may receive the communication request of the communication process, and thereafter the operating system may search for a remaining communication process with the same communication topic as the communication process, and if there is such remaining communication process, then the operating system will detect whether the remaining communication process is available for communication.

Step 303, transmit to the communication process registration information of a remaining communication process other than the communication process, the remaining communication process having an identical communication topic with the communication process.

In this embodiment, if the remaining communication process having the identical communication topic with the above-mentioned communication process and available for communication is found in step 302, then the operating system will transmit the registration information (e.g., including an IP address, a port number, a communication topic, etc.) of the remaining communication process to the above-mentioned communication process, so that the above-mentioned communication process sets up a communication connection with the remaining communication process.

Step 304, detect an operation on data being transmitted between the communication processes.

In this embodiment, there may be a management process and a plurality of communication processes in the operating system. There may be a parameter server in the management process. The above-mentioned parameter server is configured to store and maintain parameters of the robot operating system in operation, e.g., intermediate state variables, and calibration information. The operating system may detect an operation on the data being transmitted between the communication processes, wherein the operation may include at least one of updating the data, deleting the data, and storing the data.

In this embodiment, the communication processes in the operating system may operate on the data via the unified XML API which adopts the HTTP as a transmission protocol, and the XML as a remote procedure call programming interface via which an encoding format of information is transmitted. The RPC is a technology to call on a local machine a procedure (method) on a remote machine, and an RPC system includes two components, i.e., an RPC client and an RPC server, wherein the RPC client is configured to invoke a method from the RPC server, and to receive returned data of the method, and the RPC server is configured to respond to the request of the RPC client, to execute the method, and to return a result of executing the method. The above-mentioned XML, which is a subset of the standard universal markup language, is a markup language to structurally mark an electronic file. The above-mentioned API includes some predefined functions aiming to provide an application and a developer with the ability of accessing a set of routines based upon some software or hardware without accessing any source codes or knowing any details of the internal operating mechanism.

In this embodiment, the data on which the communication processes of the operating system performs operations may adopt the unified Key-Value data structure, may support various general data types and user customized data types, and may support deep nesting of data structures.

Step 305, determine whether the data are persistent data, in response to positively detecting an operation on the data being transmitted between the communication processes.

In this embodiment, the operating system may determine whether the data are persistent data, in response to positively detecting an operation on the data being transmitted between the communication processes. The persistent data refer to an object stored in a persistent storage device, e.g., data stored in a magnetic disk, a flash memory, and an XML data file.

Step 306, transmit a change message of the data to a communication process other than the communication process in response to positively determining that the data are persistent data.

In this embodiment, the above-mentioned operating system may transmit the change message of the data to the communication process other than the communication process in response to positively determining that the above-mentioned data are persistent data, so that the communication process other than the above-mentioned communication process is updated according to the change message, so the persistent data may always remain consistent across the respective communication processes.

As can be seen from FIG. 3, as compared with the embodiment corresponding to FIG. 2, the flow 300 of the method for synchronizing data in the robot operating system according to this embodiment highlights the step 301 of receiving the registration request of the communication process, the step 302 of receiving the communication request of the communication process, and the step 303 of transmitting to the communication process the registration information of the remaining communication process other than the communication process, the remaining communication process having the identical communication topic with the communication process. In this way, the solution according to this embodiment may set up the communication connection with the communication process before the change message of the persistent data is transmitted to the remaining communication process, so that the persistent data may always remain consistent across the communication processes.

Figure 4:
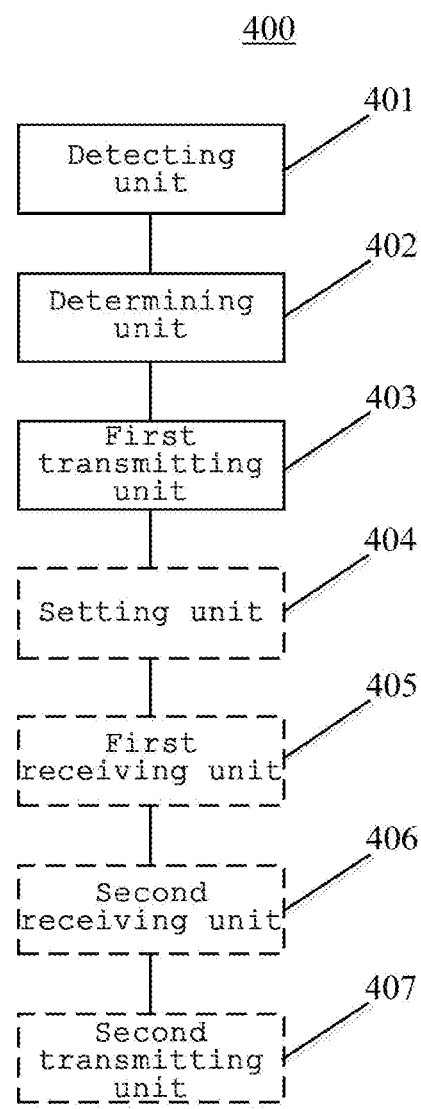
FIG. 4 is a schematic structural diagram of an apparatus for synchronizing data in a robot operating system according to an embodiment of the present application.

Further referring to FIG. 4, as an implementation of the method illustrated in the respective figures above, an embodiment for an apparatus for synchronizing data in a robot operating system is provided. The embodiment of the apparatus corresponds to the embodiment of the method as illustrated in FIG. 2. The apparatus may be specifically applied to various electronic devices.

As illustrated in FIG. 4, the apparatus for synchronizing data in the robot operating system according to this embodiment includes a detecting unit 401, a determining unit 402, and a first transmitting unit 403. The detecting unit 401 is configured to detect an operation on data being transmitted between communication processes, wherein the operation includes at least one of updating the data, deleting the data, and storing the data. The determining unit 402 is configured to determine whether the data are persistent data, in response to positively detect an operation on the data being transmitted between the communication processes. The first transmitting unit 403 is configured to transmit a change message of the data to a communication process other than the communication processes in response to positively determining that the data are persistent data.

In this embodiment, there may be a management process and a plurality of communication processes in the detecting unit 401 of the apparatus 400 for synchronizing data in the robot operating system. There may be a parameter server in the management process. The parameter server is configured to store and maintain parameters of the robot operating system in operation, e.g., intermediate state variables, and calibration information. The detecting unit 401 may detect an operation on the data being transmitted between the communication processes, wherein the operation can include at least one of updating the data, deleting the data, and storing the data.

In this embodiment, the determining unit 402 may determine whether the data are persistent data, in response to the detecting unit 401 positively detecting an operation on the data being transmitted between the communication processes, wherein the persistent data refer to an object stored in a persistent storage device, e.g., data stored in a magnetic disk, a flash memory, and an XML data file.

In this embodiment, the first transmitting unit 403 may transmit the change message of the data to the communication process other than the above-mentioned communication process in response to the determining unit 402 positively determining that the data are persistent data, so that the communication process other than the above-mentioned communication process is updated according to the change message, so the persistent data may always remain consistent across the communication processes.

In some optional implementations of this embodiment, persistent data can be distinguished from non-persistent data by an interface flag, and the robot operating system may store respective parameters by setting a persistent or non-persistent attribute for the respective data according to the interface flag. The determining unit 402 may determine whether the value representing data persisting of the data is True, and if so (that is, Persist=True), then the operating system will determine that the persistent data are persistent data; otherwise (that is, Persist=False), the operating system will determine that the data are non-persistent data.

In some optional implementations of this embodiment, the apparatus 400 for synchronizing data in the robot operating system may further include a setting unit 404 configured to set a value representing data persisting of the persistent data to True, and a value representing data persisting of the non-persistent data to False when storing the data.

In some optional implementations of this embodiment, the apparatus 400 for synchronizing data in the robot operating system may further include a first receiving unit 405 configured to first start a parameter server of the operating system; thereafter start the communication process; and then receive the registration information of the communication process, wherein the registration information may include at least one of an Internet Protocol (IP) address, a port number, and a communication topic, and the communication topic may include the name of the communication topic, the size of the communication topic, etc. The first receiving unit 405 may also set parameter values while the communication process is being started.

In some optional implementations of this embodiment, the apparatus 400 for synchronizing data in the robot operating system may further include a second receiving unit 406 and a second transmitting unit 407. The second receiving unit 406 is configured to receive a communication request of the communication process, and thereafter search for a remaining communication process having an identical communication topic with the above-mentioned communication process, and if there is such remaining communication process, to detect whether the remaining communication process is available for communication; and if the second receiving unit 406 finds the remaining communication process having the identical communication topic with the communication process and available for communication, then the second transmitting unit 407 will transmit registration information of the remaining communication process to the above-mentioned communication process, so that the above-mentioned communication process sets up a communication connection with the remaining communication process.

Figure 5:
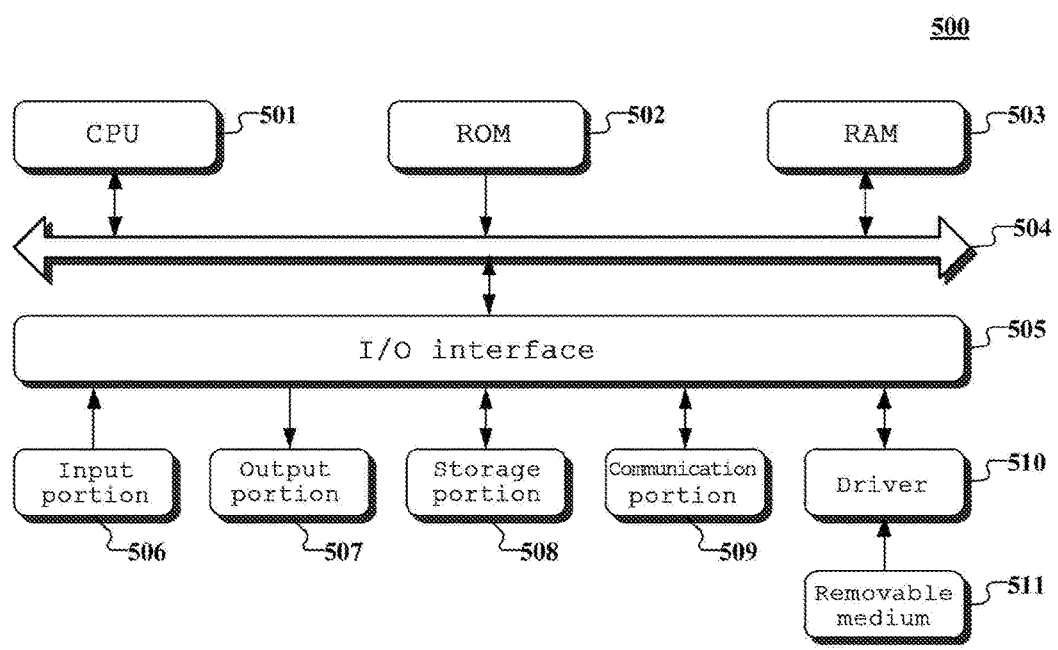
FIG. 5 is a schematic structural diagram of a computer system adapted to implement a terminal device according to an embodiment of the present application.

Referring to FIG. 5, a schematic structural diagram of a computer system 500 adapted to implement an apparatus of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 509, and/or may be installed from the removable media 511.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units or modules may also be provided in a processor, for example, described as: a processor, comprising a detecting unit, a determining unit and a first transmitting unit, where the names of these units are not considered as a limitation to the units. For example, the detecting unit may also be described as "a unit for detecting an operation on data being transmitted between communication processes."

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: detect an operation on data being transmitted between communication processes, wherein the operation comprises at least one of updating the data, deleting the data, and storing the data; determine whether the data are persistent data, in response to positively detecting an operation on the data being transmitted between the communication processes; and transmit a change message of the data to communication processes other than the communication processes in response to positively determining that the data are persistent data.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for synchronizing data in a robot operating system, the method comprising:
   detecting an operation on data being transmitted between communication processes in the robot operating system, wherein the operation comprises at least one of updating the data, deleting the data, or storing the data;
   determining whether the data are persistent data, in response to positively detecting an operation on the data being transmitted between the communication processes in the robot operating system; and
   transmitting, in response to positively determining that the data are persistent data, a change message of the data to other communication processes in the robot operating system other than the communication processes performing the operation on the data, to cause the other communication processes to update the persistent data based on the change message of the data;
   wherein prior to the detecting an operation on the data being transmitted between the communication processes, the method further comprises:
     receiving a communication request of the communication process; and
     transmitting to the communication process registration information of a remaining communication process other than the communication process, to cause the communication process to set up a communication connection with the remaining communication process, the remaining communication process having an identical communication topic with the communication process performing the operation on the data.

2. The method according to claim 1, wherein the determining whether the data are persistent data comprises:
   determining whether a value representing data persisting of the data is True; and
   determining that the data are persistent data in response to determining the value representing data persisting of the data being True.

3. The method according to claim 2, wherein the method further comprises, prior to the detecting an operation on the data being transmitted between the communication processes:

setting the value representing data persisting of the persistent data to True, and a value representing data persisting of non-persistent data to False.

4. The method according to claim 1, wherein the method further comprises, prior to the receiving a communication request of the communication process:

receiving registration information of the communication process, wherein the registration information comprises at least one of an Internet Protocol (IP) address, a port number, or a communication topic.

5. An apparatus for synchronizing data in a robot operating system, the apparatus comprising:

at least one processor; and a memory storing instructions, the instructions when executed by the at least one processor, cause the at least one processor to perform operations, the operations comprising:

detecting an operation on data being transmitted between communication processes in the robot operating system, wherein the operation comprises at least one of updating the data, deleting the data, or storing the data;

determining whether the data are persistent data, in response to positively detecting an operation on the data being transmitted between the communication processes in the robot operating system; and transmitting, in response to positively determining that the data are persistent data, a change message of the data to other communication processes in the robot operating system other than the communication processes performing the operation on the data, to cause the other communication processes to update the persistent data based on the change message of the data;

wherein prior to the detecting an operation on the data being transmitted between the communication processes, the operations further comprise:

receiving a communication request of the communication process; and transmitting to the communication process registration information of a remaining communication process other than the communication process, to cause the communication process to set up a communication connection with the remaining communication process, the remaining communication process having an identical communication topic with the communication process performing the operation on the data.

6. The apparatus according to claim 5, wherein the determining whether the data are persistent data comprises:

determining whether a value representing data persisting of the data is True; and determining that the data are persistent data in response to determining the value representing data persisting of the data being True.

7. The apparatus according to claim 6, wherein prior to the detecting an operation on the data being transmitted between the communication processes, the operations further comprise:

a setting the value representing data persisting of the persistent data to True, and a value representing data persisting of non-persistent data to False.

8. The apparatus according to claim 5, wherein prior to the receiving a communication request of the communication process, the operations further comprise:

receiving registration information of the communication process, wherein the registration information comprises at least one of an Internet Protocol (IP) address, a port number, or a communication topic.

9. A non-transitory storage medium storing one or more programs, the one or more programs when executed by a device, causing the device to perform a method for synchronizing data in a robot operating system, the method comprising:

detecting an operation on data being transmitted between communication processes in the robot operating system, wherein the operation comprises at least one of updating the data, deleting the data, or storing the data;

determining whether the data are persistent data, in response to positively detecting an operation on the data being transmitted between the communication processes in the robot operating system; and transmitting, in response to positively determining that the data are persistent data, a change message of the data to other communication processes in the robot operating system other than the communication processes performing the operation on the data, to cause the other communication processes to update the persistent data based on the change message of the data;

wherein prior to the detecting an operation on the data being transmitted between the communication processes, the method further comprises:

receiving a communication request of the communication process; and transmitting to the communication process registration information of a remaining communication process other than the communication process, to cause the communication process to set up a communication connection with the remaining communication process, the remaining communication process having an identical communication topic with the communication process performing the operation on the data.

10. The non-transitory storage medium according to claim 9, wherein the determining whether the data are persistent data comprises:

determining whether a value representing data persisting of the data is True; and determining that the data are persistent data in response to determining the value representing data persisting of the data being True.

11. The non-transitory storage medium according to claim 10, wherein prior to the detecting an operation on the data when the data are transmitted between the communication processes, the method further comprises:

a setting the value representing data persisting of the persistent data to True, and a value representing data persisting of non-persistent data to False.

12. The non-transitory storage medium according to claim 9, wherein prior to the receiving a communication request of the communication process, the method further comprises:

receiving registration information of the communication process, wherein the registration information comprises at least one of an Internet Protocol (IP) address, a port number, or a communication topic.

* * * * *